Aug. 4, 1964　　　M. H. P. DEPERTHES　　　3,143,012
HOOPED ASSEMBLY
Filed Dec. 15, 1961
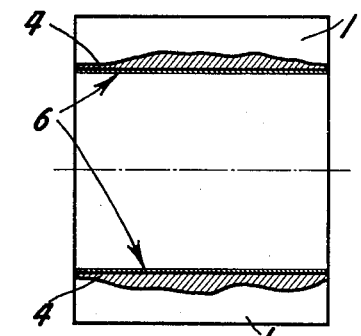
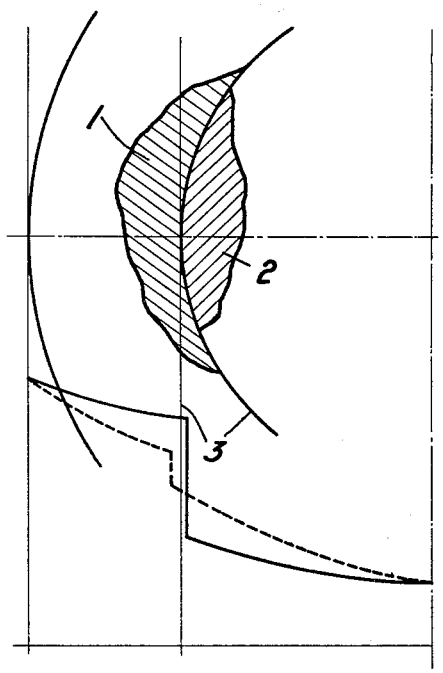
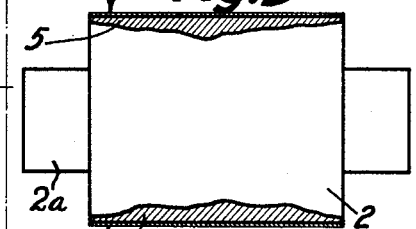
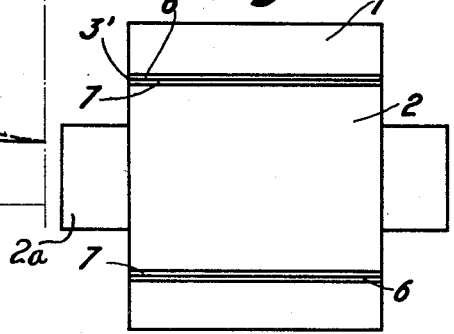
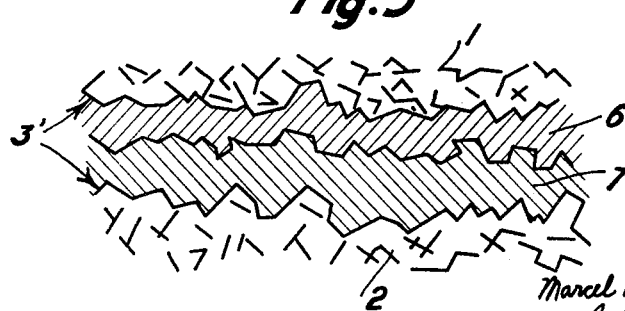
Inventor:
Marcel Henri Pierre Deperthes
By Baldwin & Wight
Attorneys

United States Patent Office 3,143,012
Patented Aug. 4, 1964

3,143,012
HOOPED ASSEMBLY
Marcel Henri Pierre Deperthes, Firminy, France, assignor to Compagnie des Ateliers et Forges de la Loire St.-Chamond-Firminy-St.-Etienne-Jacob Holtzer, Paris, France, a corporation of France
Filed Dec. 15, 1961, Ser. No. 159,560
Claims priority, application France Dec. 21, 1960
10 Claims. (Cl. 80—58)

This invention relates to hooped assemblies of the type including an inner metallic member, such as a shaft or roll, and an outer metallic hoop member closely surrounding and binding the inner member circumferentially to reinforce it against radial centrifugal forces and similar stresses developed in service. A general object of the invention is to provide an improved hooped assembly wherein an extremely strong bond will exist between the inner and outer members of the assembly under all circumstances, including conditions conducive to the establishment of high temperature gradients in the assembly.

One example of assembly to which the invention is especially applicable is a hooped roll for a hot rolling mill, though it is to be understood that this particular use is in no way restrictive as to the scope of applicability of the invention.

An object of the invention is to provide an improved hooped assembly in which a firm bond is maintained between the inner (hooped) member and the outer (hoop) member regardless of the temperature gradients developed in the assembly due for example to high temperatures applied to the outer surface of the assembly. Another object is to provide a hooped assembly in which different heat treatments may be applied to the two components of the assembly without impairing the final bond present between them. Other objects will appear.

According to an important aspect of the invention, there is provided a hooped assembly including an inner, or reinforced, metallic member and an outer, or reinforcing, metallic hoop member, and a continuous intermediate bonding layer interposed between the adjacent surfaces of said members and comprising a metallic composition having a high heat conductivity factor and of such character as to form a continuous crystalline bond with both said surfaces and to prevent the presence of any gas occluded therebetween.

The provision of such a bonding layer results in a continuous transfer of heat from the outer hoop member to the interior of the inner member, preventing the establishment of sharp thermal gradient at the interface between the members, and it is found that this feature enhances to a remrakable extent the trouble-free service life of the resulting assembly.

An exemplary embodiment of the invention will now be described for purposes of illustration but not of limitation with reference to the accompanying diagrammatic drawings, wherein:

FIG. 1 is a partial view of a hooped assembly, together with a temperature graph indicating a typical curve of temperature variation along a radial line of the assembly, respectively in the case of a conventional hooped assembly and in one constructed according to the invention;

FIG. 2 is a side view, partly broken away and in section, and on a scale smaller than that of FIG. 1, showing the outer or hoop member of a hooped assembly according to the invention;

FIG. 3 is a similar view of the inner or reinforced member of the assembly;

FIG. 4 is a side view of the complete hooped assembly; and

FIG. 5 is a large-scale micrographic view illustrating the interpenetration of the crystals in a bonding layer according to the invention.

The illustrated embodiment relates by way of example to a supporting roll for a four-roll continuous hot-rolling mill.

Whereas the use of hooped rolls in cold rolling mills does not raise any particular problems in view of the relatively small temperature variations involved in their operation, considerable problems do arise in connection with hot rolling mills in which the roll peripheries are exposed to high temperatures from the work. The differential heat expansion that tends to occur as between the reinforced inner or roll component and the outer hoop component can be so large as to result in relative rotation or slippage between the two components of the assembly, regardless of the tightness of the fit initially provided between them.

Referring to the diagrammatic showing of FIG. 1, a hooped assembly is there shown as including an inner cylindrical member 2, e.g. a roll core having a shaft 2a, and outer member 1, or hoop, tightly surrounding the inner member and applied therearound as by a shrink-on or similar process. At the bottom of the figure is shown a chart of temperature (in ordinates) versus radial distance (in abscissae). Referring to the full-line curve on the chart, it will be seen that the temperature within the outer hoop member is at a relatively high value, due for instance to external heat applied to the periphery of the assembly from the hot steel strip or other work being rolled. The temperature then sustains a sharp drop at the interface 3 between the two members 1 and 2, and remains at a much lower value within the inner member 2. Because of this sharp temperature gradient at the interface, the hoop member is exposed to a much greater degree of expansion than does the inner member. No matter how tight the initial pressure fit between the two members, the differential expansion can, and often does, produce a condition in which relative slippage occurs between the two component members after a relatively short time of service, whereupon the assembly is put out of commission.

The prior art shows numerous attempts to overcome this difficulty. Thus, hooped roll assemblies have been suggested including a relatively soft steel inner member and a hard metal outer hoop member, with grooved inter-engaging means between the members. In one modification of this latter type of assembly, the inner steel roll member initially projects at both ends beyond the ends of the hard hoop member, and after insertion axial pressure was applied to both ends of the inner member in excess of the elastic yield point of the steel in an endeavour to produce an inseparable unit. However, none of these prior attempts has been successful. It is found that no amount of mechanical pressure force applied during the actual insertion of the inner member into the hoop member, can ultimately stand up to the enormously stronger molecular separating forces that are brought to bear by a mere elevation of temperature of the hoop member and the differential expansion that ensues.

In contrast with these prior attempts relying so to speak on brute mechanical force to overpower the molecular forces generated by heat, the concept of this invention is to eliminate these molecular forces themselves by eliminating the temperature gradient that generates them. That is, the invention is based on the recognition that the high temperature gradient or temperature drop occurring in all conventional hooped assemblies no matter how tightly assembled, at the interface between the members, as shown on the full line temperautre chart of FIG. 1, is due simply to the fact that said interface 3 acts as a heat barrier preventing an equalization of the temperatures between the two members, and that this effect in turn is a result, inter alia, of the presence of minute cavities in which occluded air and gases are present, preventing proper heat transfer.

According to the invention, therefore, there is interposed at the interface 3 between the members 1 and 2 a bonding layer of metal composition having a high thermal conductivity factor and so selected that the crystal particles of the composition will interpenetrate intimately the crystal particles of both adjacent metallic surfaces of the inner and outer members, whereby to prevent the presence of even the most minute bubbles or blowholes of air and gas at the interface. It is found possible with such an arrangement to achieve a practically continuous transmission of heat through the assembly, with a negligibly small drop in temperature across the interface. This is indicated by the dotted-line curve on the temperature chart of FIG. 1, which is based on temperature measurements made on a hooped assembly constructed in accordance with the teachings of this invention.

The intermediate bonding layer of the invention may actually be formed from two base layers respectively applied to the inner surface of the hoop member and the outer surface of the inner member. Both constituent layers may be made from the same, or from different, metals, but should in any case be so selected and applied as to permit of an intermingling of the crystal particles thereof with the crystal particles of the adjacent surfaces of the members of the assembly, in order to prevent the presence of occluded gas at any point of the interface. Preferably there is provided between the base layers an intermediate layer of greater depth having a high thermal conductivity factor.

Various coating processes of generally known character may be used for applying the metal bonding layer or layers of the invention. Thus, electroplating techniques may be used, or the coatings may be hammered on or coiled on in strip form at high temperatures.

In one form of the invention, the constituent layer applied to the surface of each of the members of the assembly may comprise a base coating of nickel, followed by a high heat-conductive coating of copper and followed by a base layer of tin. Silver may be used instead of copper as the conductive layer.

If desired, the provision of a bonding layer according to the invention may be combined with the feature of providing the inner member of the assembly from a metal having a higher expansion coefficient than the outer hoop member. The special advantage of this step when applied to the invention lies in the fact that, as shown by the dotted line chart in FIG. 1, the inner member is brought to a temperature closely approximating that of the hoop member, whereupon the higher expansion factor of the inner member will act to tighten the fit between the two members. In the absence of the intermediate layer, it is clear that a similar effect would not be achieved owing to the considerable difference in temperatures between the two members as shown by the full-line curve in FIG. 1.

Referring to FIGURES 2-4 for a more detailed description of the invention, there is shown at 1 the hoop member and at 2 the inner reinforced member of a hooped roll assembly for a four-roll mill. The inner surface 4 of the hoop member 1 and the outer surface 5 of the roll 2 are each coated with a metal base layer 6, 7 respectively preferably having a high heat conductivity factor, and of a relatively soft composition so that on assembly between the two members the two layers will interpenetrate at the interface as at 3' (also see FIG. 5), eliminating any bubbles of air and vapour that may be present. The process of applying the coatings should be so performed as to permit the air and vapour to freely discharge.

A preferred method of applying the metal layers of the invention is an electrolytic buffer process. With such a process there may be applied to the surface of each of the members 1 and 2 a composite facing comprising a base layer about 2 microns thick comprising nickel, thereover a conductive layer about 20 microns thick comprising copper or other high conductivity metal, and finally a layer of tin which may be about 6 microns thick. Thus, the thickness of each composite facing is about 28 microns. During the hooping operation, i.e. the press-fitting or shrinking-on assemblage of the two members 1 and 2, which operation may be performed by any of the conventional processes, the crystal particles of the various layers interpenetrate as shown pictorially in FIGURE 5 and expel any minute particles of air and gas that may be present and that would otherwise be entrapped at the interface.

In the operation of a hooped assembly according to the invention, as the assembly is exposed to high service temperatures, the interface layer produced in the manner described only opposes a negligible barrier against the transfer of heat from the outer surface to the inner parts of the assembly, as shown by the dotted-line curve in the chart of FIGURE 1 discussed above, so that there is no sharp temperature gradient through the assembly nor are any large differential expansion forces set up tending to separate the outer from the inner member. Thus the assembly retains its bonded condition for longer periods of time.

According to a modification of the invention, as earlier noted, the provision of the bonding heat-conductive layer of the invention is advantageously coupled with the use of a higher-expansion metal for the inner than for the outer member of the assembly. Various other modifications and departures from the specific metallic compositions indicated may be made without exceeding the scope of the invention.

I am aware that there has been disclosed in the prior art a method of hooping assembly in which there is initially provided between the inner and outer members a substantial radial space of the order of several millimeters in width, by means of differential heating. This gap is filled with molten metal providing a bonding layer. The purpose of this procedure is simply to avoid having to machine the inner and outer diameters of the members to accurate tolerances. Such a layer cannot nor does it eliminate the heat barrier and temperature gradient present between the outer and inner members, since it does not exclude the presence of gaseous occlusions responsible for such heat barrier. Hence it does not achieve the beneficial results of the invention.

What I claim is:

1. A hooped assembly including an inner metallic member having an outer surface and an outer metallic member having an inner surface, said inner member having on its outer surface and united thereto at least one layer of a metal having good heat conductive properties, said outer surface and its layer having at their interface a first continuous crystalline union with the crystals of said layer and the crystals of said inner member intermingling with each other and said first crystalline union being substantially free of occluded gas; said outer member having on its inner surface and united thereto at least one other layer of a metal having good heat conductive properties, said inner surface and said other layer having at their interface a second continuous crystalline union with the crystals of said other layer and the crystals of said outer member intermingling with each other and said second crystalline union being substantially free of occluded gas, said layers being in forcible contact with and united to each other and being of such softness that there is formed a third continuous crystalline union at their interface with the metal of the respective layers interpenetrating each other and said third crystalline union being substantially free of gas, whereby there is provided a good heat conducting path between said two members.

2. The assembly of claim 1, wherein said inner member has a higher coefficient of thermal expansion than said outer member.

3. The assembly of claim 1, wherein each member has three layers.

4. The assembly of claim 3, wherein the central one of said three layers for each member is thermally more conductive than the other two layers.

5. The assembly of claim 4, wherein said central layer for each member is copper.

6. The assembly of claim 4, wherein said central layer for each member is silver.

7. The assembly of claim 3, wherein the three layers of each of said members consist of a central layer of copper substantially 20 microns thick, a layer of tin substantially 6 microns thick, and a base layer of nickel substantially 2 microns thick.

8. A hot rolling mill hooped roll assembly including an inner metallic member having a shaft and an outer surface and an outer metallic member having an inner surface which, in the use of said assembly, is to be exposed to a temperature higher than the ambient temperature, said inner member having on its outer surface and united thereto at least one layer of a metal having good heat conductive properties, said outer surface and its layer having at their interface a first continuous crystalline union with the crystals of said layer and the crystals of said inner member intermingling with each other and said first crystalline union being substantially free of occluded gas, said outer member having on its inner surface and united thereto at least one other layer of a metal having good heat conductive properties, said inner surface and its said other layer having at their interface a second continuous crystalline union with the crystals of said other layer and the crystals of said outer member intermingling with each other and said second crystalline union being substantially free of occluded gas, said layers being in intimate contact with each other under pressure between said inner and outer members and having such properties that under said pressure there is a third continuous crystalline union at their interface with the metal of the respective layers interpenetrating each other and said third crystalline union being substantially free of gas, said crystalline unions and said layers providing a good heat conducting path between said inner and outer members.

9. A method for providing a thermally conductive interface between a hooped assembly including an inner metallic member and an outer metallic member; applying a good heat conductive metallic layer to the outer surface of the inner member so that a first continuous crystalline union at the interface of the member and the coating is formed free of occluded gas with the crystals of said layer and the crystals of said inner member intermingling with each other; applying another good heat conductive metallic layer to the inner surface of the outer member so that a second continuous crystalline union at the interface of the member and the coating is formed free of occluded gas with the crystals of said other layer and the crystals of said outer member intermingling with each other; and tightly hooping the outer member over the inner member whereby a third continuous crystalline union is formed at the interface of said two coatings free of occluded gas with the metal of the respective layers interpenetrating each other.

10. A hooped assembly including an inner metallic member having an outer surface and an outer metallic member having an inner surface, said inner member having on its outer surface and united thereto a facing about 28 microns thick and comprising at least one layer of a metal having good heat conductive properties, said outer surface and its facing having at their interface a first continuous crystalline union with the crystals of said facing and the crystals of said inner member intermingling with each other and said first crystalline union being substantially free of occluded gas; said outer member having on its inner surface and united thereto another facing about 28 microns thick and comprising at least one other layer of a metal having good heat conductive properties, said inner surface and said other facing having at their interface a second continuous crystalline union with the crystals of said other facing and the crystals of said outer member intermingling with each other and said second crystalline union being substantially free of occluded gas, said facings being in forcible contact with and united to each other and being of such softness that there is formed a third continuous crystalline union at their interface with the metal of the respective facings interpenetrating each other and said third crystalline union being substantially free of gas, whereby there is provided a good heat conducting path between said two members.

References Cited in the file of this patent

UNITED STATES PATENTS

| | | |
|---|---|---|
| 23,633 | Wilcox | Apr. 12, 1859 |
| 1,996,500 | Adams | Apr. 2, 1935 |
| 2,812,571 | Strom | Nov. 12, 1957 |
| 3,014,266 | Samuels et al. | Dec. 26, 1961 |
| 3,077,285 | Budininkas | Feb. 12, 1963 |

FOREIGN PATENTS

| | | |
|---|---|---|
| 319,236 | Germany | Mar. 1, 1920 |